US008892048B1

(12) United States Patent
Turner

(10) Patent No.: US 8,892,048 B1
(45) Date of Patent: Nov. 18, 2014

(54) TRANSPARENT MULTI-ELEMENT ANTENNA

(75) Inventor: R. Brough Turner, Newton, MA (US)

(73) Assignee: Netblazr Inc., Watertown, MA (US)

( * ) Notice: Subject to any disclaimer, the term of this patent is extended or adjusted under 35 U.S.C. 154(b) by 355 days.

(21) Appl. No.: 13/307,400

(22) Filed: Nov. 30, 2011

Related U.S. Application Data

(60) Provisional application No. 61/458,715, filed on Dec. 1, 2010.

(51) Int. Cl.
*H04B 1/00* (2006.01)
*H04B 15/00* (2006.01)

(52) U.S. Cl.
USPC .... 455/63.4; 455/66.1; 455/562.1; 455/67.11

(58) Field of Classification Search
USPC ............ 455/66.1, 63.4, 67.11, 65, 62, 82, 83, 455/562.1, 101, 121, 277.1, 279.1; 342/32, 342/29, 30
See application file for complete search history.

(56) References Cited

U.S. PATENT DOCUMENTS 5,247,381 A * 9/1993 Olmstead et al. ............... 398/58
6,313,783 B1 * 11/2001 Kuntman et al. ............... 342/32
2009/0195471 A1 * 8/2009 Semonov ...................... 343/810

* cited by examiner

*Primary Examiner* — John J Lee
(74) *Attorney, Agent, or Firm* — Chapin IP Law, LLC

(57) ABSTRACT

An urban environment having many subscribers in close proximity is interconnected by a line of sight wireless network such that individual subscribers connect to an ISP backbone or hub directly or indirectly through other subscribers in the wireless network. A set of subscribers therefore form a multi-node mesh network of line-of-sight adjacency. In an urban environment, line-of-sight adjacency between buildings is facilitated by window placement of transparent directional antennas. High density, high capacity, networks are formed using the transparent directional antennas where transparency facilitates window mounting and directionality reduces received interference and increases capacity. Each subscriber employs a configuration for communication "upstream" towards the ISP and "downstream" to other subscriber nodes. Each subscriber node includes one or more radios for communication upstream and downstream, a router, and a transparent directional antenna for communication with adjacent nodes.

22 Claims, 4 Drawing Sheets

TRANSPARENT MULTI-ELEMENT ANTENNA

RELATED APPLICATIONS

This application claims the benefit of U.S. Provisional Patent Application No. 61/458,715, filed Dec. 1, 2010, entitled "TRANSPARENT MULTI-ELEMENT ANTENNA", incorporated herein by reference in entirety.

BACKGROUND

With the advent of email and interactive media becoming the primary medium for business communications, Internet access is a fundamental business utility. Internet service providers (ISPs) offer connectivity on a fee for services basis, typically proportional to a quantity of bandwidth (speed) provided and QoS (Quality of service) assurances for prioritized traffic according to a service level agreement (SLA). Large ISPs typically offer coverage to an entire region, such as a town or city, and therefore provide a complete coverage network within the entire area. Certain locations, however, due to factors such as subscriber density, may be amenable to an alternate access medium. Such an alternate, or specialized access medium may therefore be offered in selective markets where it can leverage aspects of the local environment, such as in an urban environment having a large number of subscribers in a relatively small area.

SUMMARY

An urban environment having many subscribers in close proximity is the basis for a line of sight wireless network such that individual subscribers connect to an ISP (Internet service provider) backbone or hub directly or indirectly through other subscribers in the wireless network. A set of subscribers therefore form a multi-node mesh network of line-of-sight adjacency for urban deployment. Each subscriber employs a configuration for communication "upstream" to the ISP and "downstream" to other subscriber nodes. Each subscriber node includes a router and one or more radios with directional antennas for communication with adjacent nodes having a similar configuration. Each node also includes a wired or wireless interface for providing Internet connectivity for the local users at the subscriber site.

The disclosed wireless communications system interconnects wireless nodes in or on separate buildings or other structures, typically in an urban environment. High density, high capacity, networks are formed using directional antennas with either fixed aiming or electronic beam forming and beam steering with directional beams used to reduce received interference and significantly increase total capacity (via spatial reuse of available spectrum).

While nodes can be placed anywhere in or around a subscriber's location, nodes are typically located indoors with antennas pointing out a window. This puts the wireless nodes within the premises of network participants, simplifying both the decision to participate and the installation. To establish the network, each node must to be able to form high capacity communications links with one or more nearby nodes, typically window-to-window. Mounting in or near windows works well because, in general, RF signals are not severely attenuated by ordinary window glass.

The line-of-sight mesh network therefore provides a specialized access medium that is very cost effective by leveraging the local environment of a dense subscriber arrangement having line-of-sight adjacency suitable for antenna-based (i.e. wireless) coupling. One caveat, however, to this arrangement is that each subscriber effectively operates as a transit node for downstream users, and maintains the radio and antenna equipment in such proximity so as to maintain the line of sight adjacency to neighboring nodes. Configurations herein are based, in part, on the observation that, in the multi node mesh network of wireless line-of-sight adjacency for urban deployment, the wireless transmission medium (such as an antenna or laser) typically occupies valuable window area, and often requires manual repositioning for focusing an optimal signal to an adjacent node. Unfortunately, conventional approaches often take the form of one or more radios proximate to the window, and an antenna device on or near the window and visible therefrom.

Accordingly, configurations herein substantially overcome the above described shortcomings by providing a transparent wireless node having antenna and radio circuits disposed via transparent microstrips or other transparent conductors on a transparent substrate for nonobstructive hanging in a window having a line of sight to an adjacent node. Disclosed configurations include a radio transceiver and antenna assembly that is unobtrusive and/or attractive and beneficial enough that most subscribers would be willing to hang it in their window or hang separate units in several windows. An additional feature is to steer highly directional beams electronically so the radio/antenna assembly can be hung in a window with no need for manual aiming. The transparent wireless antenna disposes independent antenna elements in an array to create and steer highly directional beams. Additional configurations include Multiple Input Multiple Output (MIMO) techniques to leverage multiple antenna elements to provide directional transmission and reception. In addition, MIMO can increase capacity by sending multiple data streams over a set of radio/antenna elements.

In further detail, a multi-element transparent directional antenna as employed herein includes a substantially transparent substrate for adhering conductive circuit elements, and a plurality of antenna elements arranged on a surface of the substrate for providing beamforming to a resulting wireless signal transmitted from the antenna elements. The antenna includes a radio circuit disposed on the substrate for activating the antenna elements, and is formed such that traces on the substrate interconnecting each of the antenna elements to the radio circuit for transporting activation signals between the radio circuit and the antenna elements. The substrate includes a conductive layer configured as a ground plane and a dielectric layer adhered to the conductive layer between the traces. The antenna elements defining a phased array responsive to phased array switching for aiming the resulting signal such that the transmitted signal is stronger in the aimed direction. The phased array is responsive to phased switching for activating the antenna elements according to a timing sequence for providing the aiming, and may also include MIMO control for further beamforming and beamsteering capability.

Alternate configurations of the invention include a multiprogramming or multiprocessing computerized device such as a multiprocessor, controller or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a non-transitory computer-readable storage medium including computer program logic encoded as instructions thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A node in the wireless network uses one, two or more separate directional radio transceivers to support high capacity connections with other nodes. Since these radios work through the same windows that people look through and by which interior rooms receive outdoor light, these wireless nodes must be unobtrusive. At the same time, highly directional antennas are desirable, as this minimizes the RF energy required for a link and reduces the impact of interference from other devices operating on the same or nearby frequencies. Unfortunately increased directionality requires larger antennas and/or antennas with multiple elements spaced farther apart. For example, at 5 GHz, a 45° beam can be achieved with a device little more than 3" in diameter while a 6° beam requires an antenna more than 16" in diameter. Thus at 5 GHz, a highly directional antenna would typically block a substantial portion of most windows.

Figure 1:
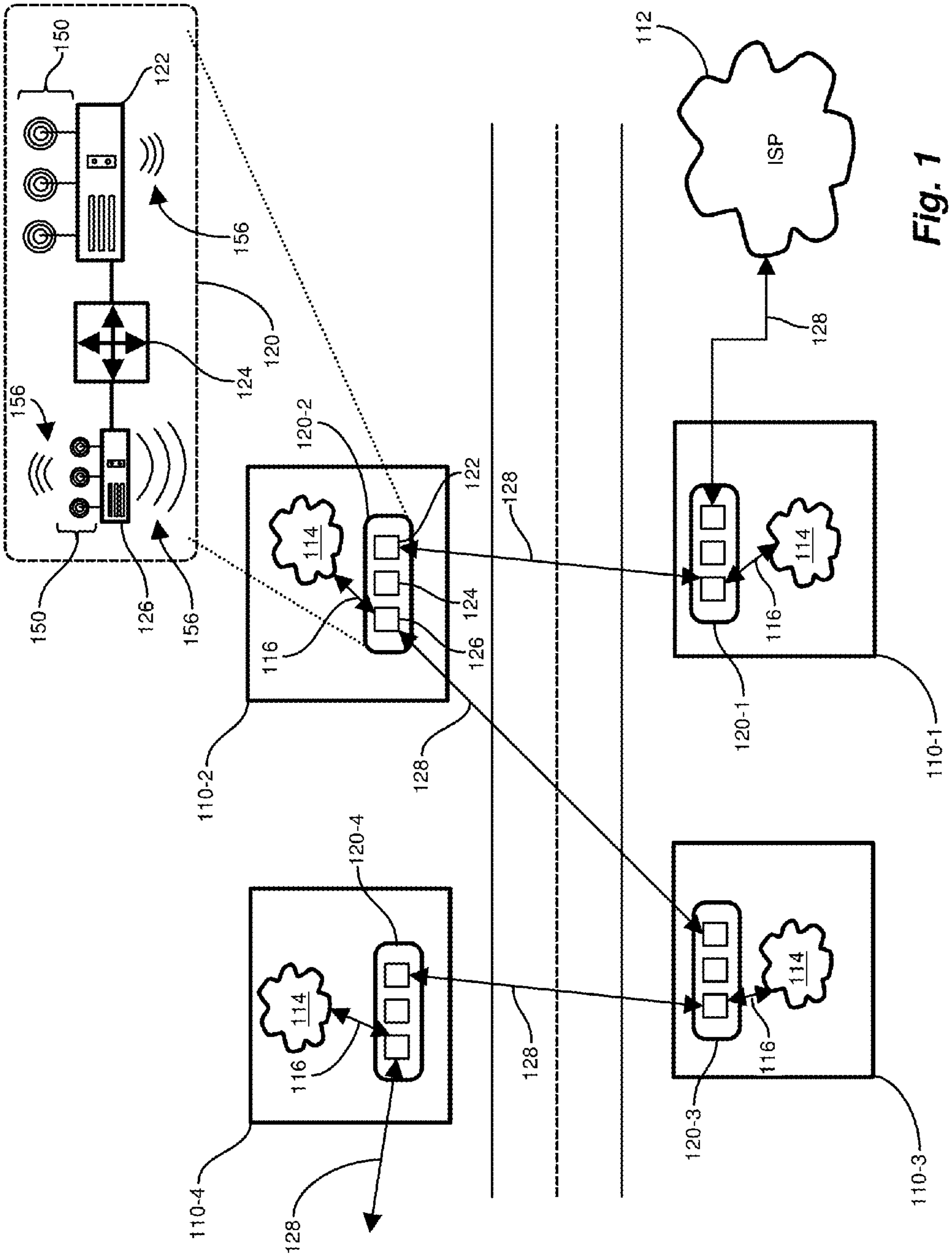
FIG. 1 is a context diagram of a wireless networking environment suitable for use with configurations disclosed herein.

FIG. 1 is a context diagram of a wireless networking environment suitable for use with configurations disclosed herein. Referring to FIG. 1, in the wireless networking environment 100, subscriber sites 110-1 . . . 110-4 (110 generally) receive Internet service from an ISP 112. Each subscriber 110, typically an office building or floor/suite thereof, employs a mesh node (node) 120-1 . . . 120-4 (120 generally) for communicating with adjacent nodes in the environment 100. Each node 120 includes at least 2 radios: an upstream radio 122 and a repeater/access point (AP) radio 126, each having a respective antenna 150, and a router 124, Each radio is responsive to at least one wireless link 128 to an adjacent node 122. The radio 122 communicates upstream toward the ISP and the repeater/AP radio 126 transmits downstream to extend the mesh network to additional subscribers. The repeater/AP 126 radio may also serve local clients 114 via a local link 116. Alternatively, the local link 116 may be serviced by a separate radio on order to avoid impacting downstream subscribers 110. And alternately, local clients 114 may be served by a wired link to router 124.

Each of the subscribers 110 has at least one line-of-sight link 128 with an adjacent subscriber 110; in the example shown, adjacent subscribers 110 are across a street, providing a clear path for the links 128. The radios and antennas may be of any suitable construction, such as that described in copending U.S. patent application Ser. No. 13/252,715, filed Oct. 4, 2011, entitled "MINIMAL EFFORT NETWORK SUBSCRIBER REGISTRATION," incorporated herein by reference. In configurations discussed further below, the antenna 150 is a transparent antenna having conductive elements and circuits thereon for defining the radios of the node. In such configurations, beamforming and beamsteering are employed for directing the wireless signals 156 over the wireless links 128 to an adjacent node 120 via a transparent wireless antenna, discussed further below.

Figure 2:
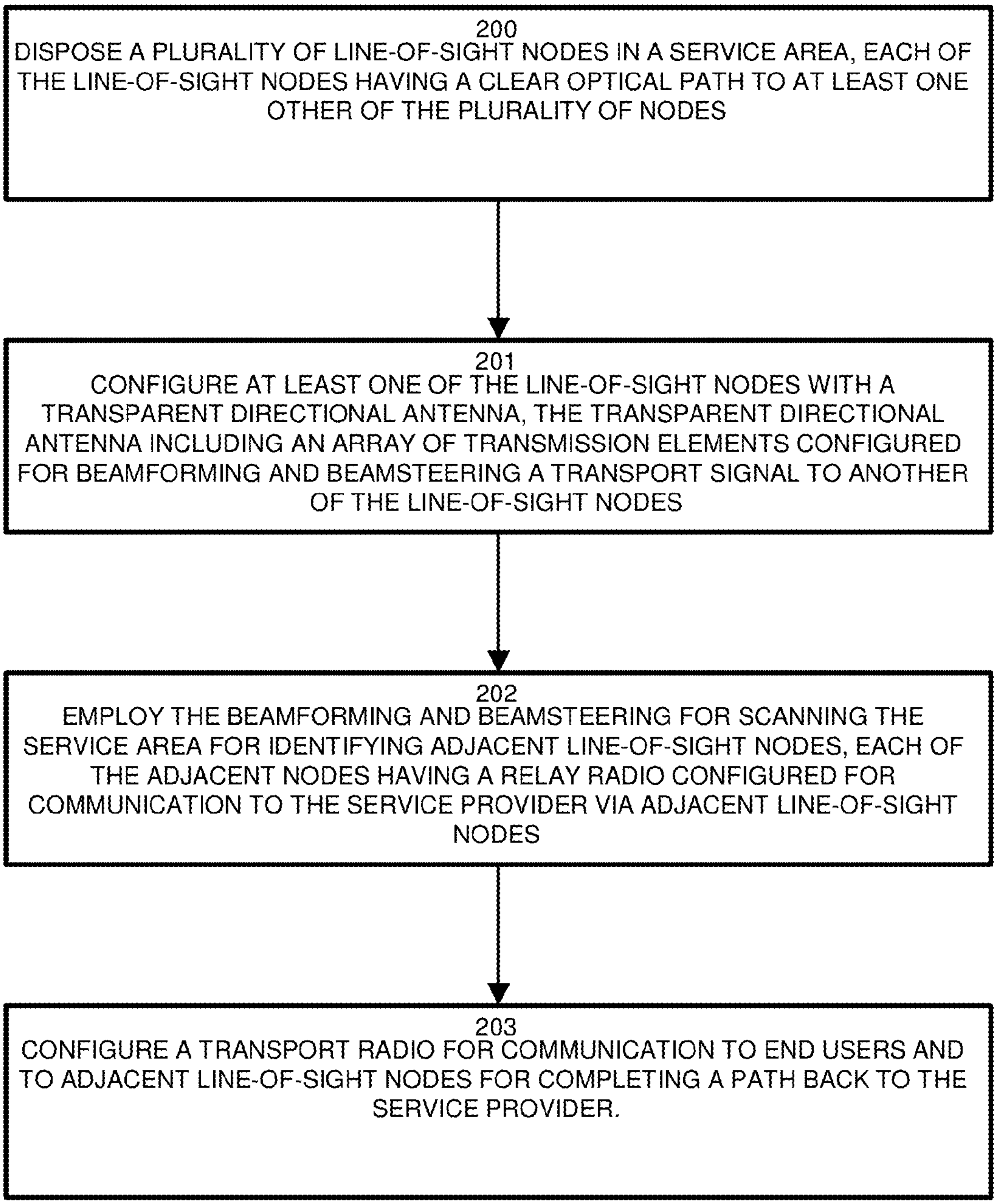
FIG. 2 is a flowchart of network deployment of a directional antenna in the network of FIG. 1.

FIG. 2 is a flowchart of network deployment of a directional antenna in the network of FIG. 1. Referring to FIGS. 1 and 2, in the disclosed system for transporting information between subscribers 110 and a service provider 112, the wireless networking environment disposing a plurality of line-of-sight nodes 120-N in the service area (environment 100), such that each of the line-of-sight nodes 120 has a clear optical path to at least one other of the plurality of nodes 110, as depicted at step 200. Each node 120 includes hardware for routing and communication downstream to adjacent nodes and upstream to the service provider 112, including a router 124 at least two radios 122, 126 conversant in a transmission medium employed for the transport signals 156. In an example arrangement, wireless signals according to IEEE 802.11 standards are employed. Implementations may focus on operation in the 5 GHz license-exempt bands due to beamforming and beamsteering properties, discussed further below with respect to FIG. 4 however the approach is applicable to any spectral band, licensed or unlicensed and to any form of communications link, for example, using other radios or using laser links.

One or more of the line-of-sight nodes 120 is configured with a transparent directional antenna, in which the transparent directional antenna includes an array of antenna elements 164 configured for beamforming and beamsteering a transport signal to another of the line-of-sight nodes 120. Any suitable transmission element or similar component may define the antenna elements, depending on the beamforming and beamsteering parameters desired, as discussed further below. Nodes not equipped with the transparent directional antenna as defined herein simply employ a conventional antenna within the line-of-sight, such as on a windowsill, nearby ceiling or window-flanked table and connected to adjacent hardware for the radio and routers. The transparent directional antennas 150' (FIG. 3, below) employ a small non-transparent portion for housing the circuit elements for the router 124 and/or radio 122, 126 functions, or alternatively may employ external connections to stand-alone devices for these functions.

Upon deployment, the system employs the beamforming and beamsteering for scanning the service area 100 for identifying adjacent line-of-sight nodes 120, such that each of the adjacent nodes 120 has a relay radio 122 configured for communication upstream towards the service provider 112 via adjacent line-of-sight nodes 120-N, as shown at step 202, and employs a transport radio 126 configured for communication to adjacent line-of-sight nodes downstream 120(N+1), as depicted at step 203 and optionally to end users (via 114).

Figure 3C:
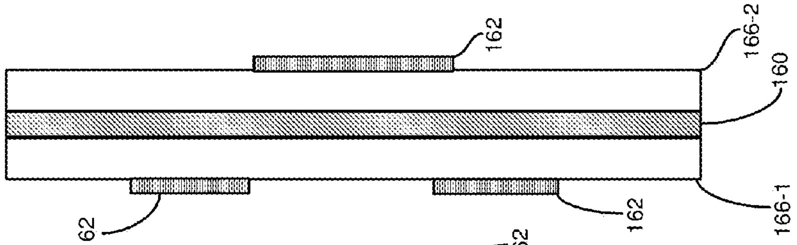
FIG. 3*c* is a cutaway view of a dual layer configuration of the antenna of FIG. 3*b;*
Figure 3B:
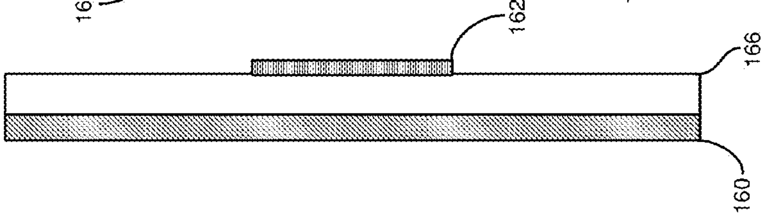
FIG. 3*b* is a cutaway view of the antenna of FIG. 3*a;*
Figure 3A:
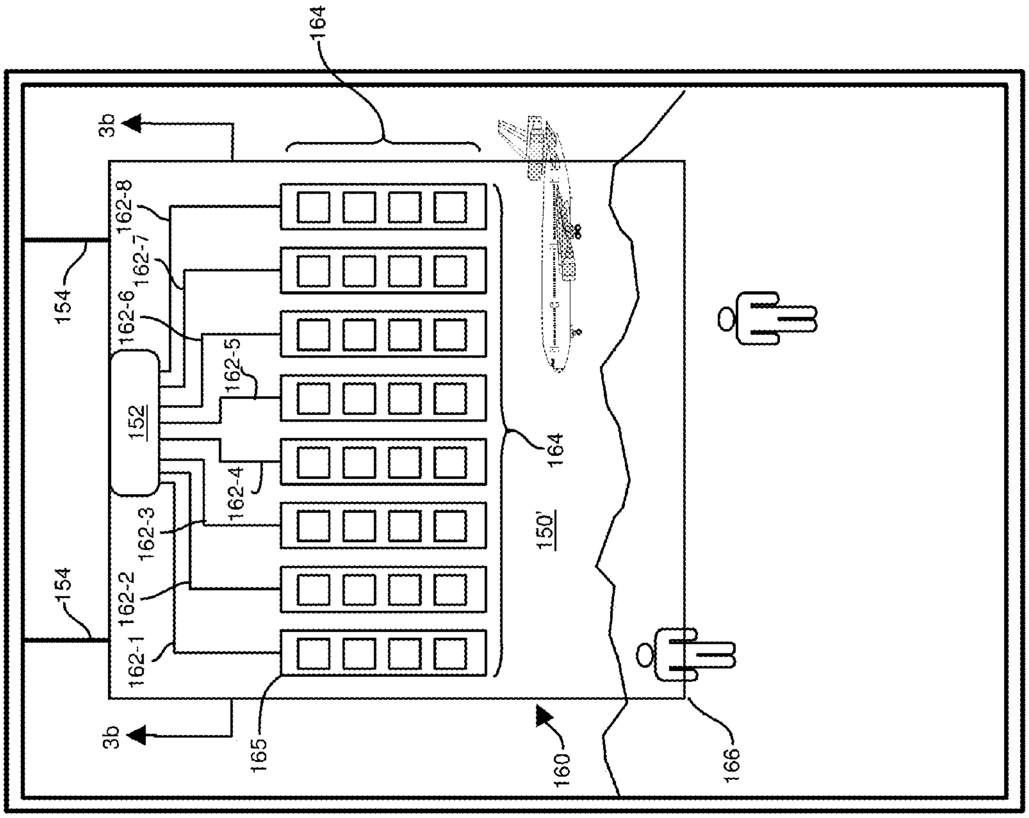
FIG. 3*a* is a front view of a directional antenna deployed in FIG. 2.

FIGS. 3*a*-3*c* show the transparent wireless antenna 150.' FIG. 3*a* is a front view of a directional antenna deployed in FIG. 2. Referring to FIGS. 1 and 3*a*, the multi-element transparent directional antenna 150' in constructed of a substantially transparent substrate 166 for adhering conductive circuit elements, and a plurality of antenna elements 164 arranged on a surface of the substrate 166 for providing beamforming to a resulting signal transmitted from the antenna elements. The transparent antenna 150' also includes a radio circuit 152 disposed on the substrate 160 for activating the antenna elements 164, and traces 162 on the substrate interconnecting each of the antenna elements 164 to the radio circuit 152 for transporting activation signals between the radio circuit 152 and the antenna elements 164 (the trace 162 connections shown are exemplary, as actual phased array switching may require precise trace lengths to respective antenna elements). The transparent antenna 150' therefore defines the entire node 120 by including a radio that can function as either 122 or 126 plus a router 124, thus providing the functionality of the entire node 120 in one (substantially transparent) assembly.

In the example arrangement, the same antenna elements 164 are used alternately for transmission and reception in a time division duplex arrangement as is typical in radio standards like IEEE 802.11 (WiFi). Antenna elements within a vertical stack 165 are driven by a single signal 162-1 . . . 162-8 but with different phase delays 172-1 . . . 172-3 for each element. Switches 170-1 thru 170-3 allow a choice of different phase delay configurations. Interference between the signals radiated by or received by each antenna element makes the transmission or reception of wireless signal 156 stronger in the aimed direction and the choice of which predefined phase delay configuration is active determines the direction of wireless signal 156, i.e. it "steers the beam."

Any suitable phased array switching, or alternatively, MIMO switching, may be employed, discussed further below. Further, the resulting transported signals 156 include transmit and receive directions, as the phased array accommodates reception of incoming signals from a "steered" direction as well, depending on an activation timing of the antenna elements 164.

In the particular example arrangement shown in FIGS. 3*a* and 4, the radio circuit 152 includes an 8×8 MIMO control, discussed further below with respect to FIG. 4, driving 8 vertical stacks 165 of antenna elements from respective traces 162-1.162-8.

Since beamforming and beamsteering capabilities are based on the spacing of the antenna elements 164 relative to the wavelength of supported frequencies, placement of the antenna elements in a phased array are significant. In general, the "tighter" (narrower) the beamforming and beamsteering capabilities, the larger the array required. For example, in the 5 GHz range, a 15 degree transmission beam employs an antenna element 164 array about 8 inches wide. For a 10 degree beam, the size increases to about 12-13 inches, and a 16-17" array is needed for a 6 degree beam.

In a particular arrangement, the multi-element antenna 150' is transparent, while the actual electronic elements that make up all or part of the associated radio and router circuits 152 may be opaque. However, the opaque elements are quite small and can typically be concealed in a border or made part of appropriate overlay artwork. Alternative configurations may employ additional transparent electronic components to further reduce the visual impact of our wireless node.

Continuing to referring to FIGS. 3*a*-3*c*, the antenna 150' includes a control circuit 152, which includes the radio 122, 126 and router 124 circuits. The control circuit 152 may employ a single radio for servicing both the upstream and downstream directions due to increased efficiency of the directional antenna 150'. The antenna 150' is constructed of a transparent ground plane 160, and a dielectric layer 166 that separates the ground plane 160 from circuit traces such as microstrips 162. The microstrips 162 provide electrical connections from the control circuit 152 to antenna elements 164, disposed according to a predetermined pattern on the dielectric layer 166, which is based on an expected wavelength of transmitted signals and on beamforming parameters that define the width of the beam, discussed further below in FIG. 4. Generally, a narrower beam is enabled by a greater distance between the outer most antenna elements 164 while the shape of the beam is controlled by the number and spacing of elements between the outer most elements. The antenna 150' hangs from a pair of supports 154 (cables or wire), one of which is a Cat 6 cable for connection to the router 124 or other wired entity.

The antenna elements 164 are disposed according to a predetermined spacing based on the expected wavelength, such that the predetermined spacing configures the antenna elements for beamforming a directional signal having an arc width based on the predetermined spacing. As discussed above, a wider antenna array generates a more focused (narrower) beam, but therefore obscures more window area. The transparent antenna 150' disposes the antenna elements 164 in a predetermined pattern defining a horizontal component and a vertical component, such that the horizontal and vertical components are responsive to a delay signal for directing the resulting signal along a horizontal axis and the vertical components directing the resulting signal along a vertical axis. The relative phase delays for steering the beam may be determined by the switched selection of one of several preset delay configurations or through the use of MIMO control, such that the vertical component is responsive to a phased array control and the horizontal component is responsive to a MIMO control. Courser control in the vertical direction may be acceptable because it is unlikely that there will be multiple adjacent nodes 120 disposed vertically. In a typical urban environment, however, since building fronts typically oppose each other, horizontal beamsteering to adjacent nodes 120 on an opposed side of the street may benefit from the enhanced beamsteering available with MIMO.

The antenna 150 consists of a conductive layer 160 configured as a ground plane and adhered to a solid dielectric 166 with conductive traces 162 adhered to the other side of the dielectric. In the example arrangement, the traces 162 are transparent microstrips having conductive properties for transporting signals between the radio circuit 152 and the antenna elements 164, such that the resulting wireless signals 156 are configured for internode transport between a plurality of like directional antennas 150', or alternatively, transport to conventional antennas defining other nodes 120 in the mesh network environment 100. The traces 162 may also comprise strategically placed semi-transparent or opaque traces such that there is minimal obscurement to the outside view.

Commonly employed transparent coatings include doped metal oxides such as Indium Tin Oxide (ITO) and conductive polymers like Poly(3,4-ethylenedioxythiophene) (PEDOT). Neither has the conductivity of copper but at ~104 S/cm, ITO is usable for not only ground planes but microstrip conductors and patch antennas. Alternate configurations may employ graphene upon commercial deployment, as it promises even better conductivity and more transparency.

An additional advantage of the transparent microstrip technology described above, i.e. the transparent ground plane 160 together with glass or plastic as a dielectric and traces 162, is that the same technology can also be used to form patch antennas, phase delays, dividers, couplers, filters and other microwave components.

The transparent or translucent assembly may be used directly (with, at most, fine wires that are visible only to those who observe closely) or artwork can be applied to turn the wireless node into a work of art. For example, a layer of plastic or paint can simulate a stained glass window, or actual stained glass can be applied as an additional layer.

FIGS. 3*b* and 3*c* show different layer arrangements. FIG. 3*b* is a cutaway view of the antenna of FIG. 3*a*, and FIG. 3*c* is a cutaway view of a dual layer configuration of the antenna of FIG. 3*b*. FIG. 3*b* employs microstrip 162 elements on one side, while FIG. 3*c* shows a dual layer configuration having microstrips 162 or other circuit traces disposed on both sides of the ground plane 160, each separated by a dielectric 166-1, 166-2 layer. This configuration allows the outward facing layer to perform downstream/upstream transmissions to adjacent nodes 110, while the inward facing side provides a local link 128 to the local users 114.

Since the trace elements 162 are raised above the substrate surface 166, they may be visually perceptible even though they are transparent due to the discontinuity between the traces 162 and the uncoated spaces between traces. To further increase transparency, these uncoated areas between traces may be filled with a nonconductive substance having similar optical properties as the trace elements, such that the nonconductive substance fills the voids substantially flush with a top surface of the trace elements 162 to define a planar surface.

Figure 4:
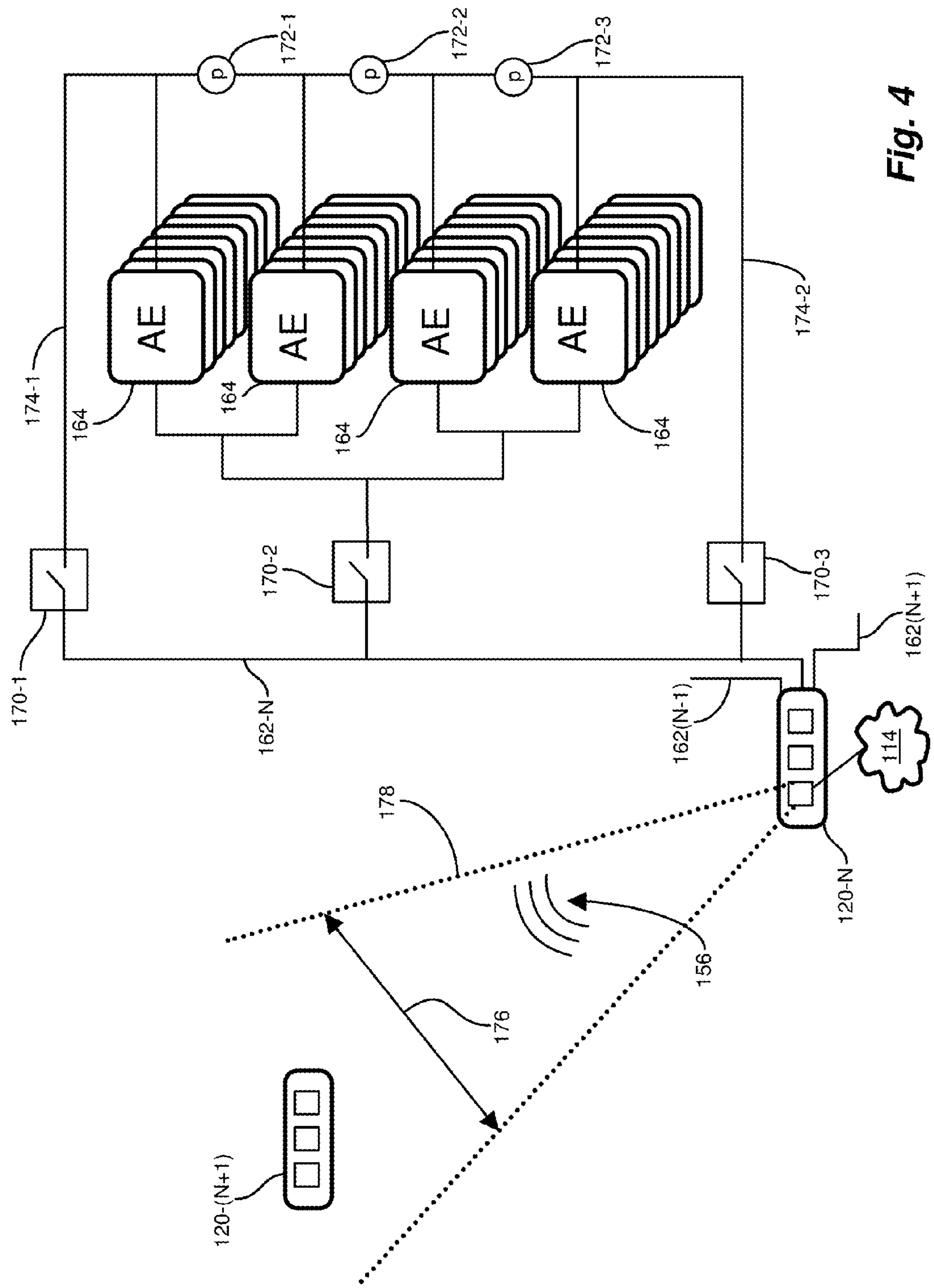
FIG. 4 is a beamforming circuit employed in the directional antenna of FIGS. 3*a*-3*b*.

FIG. 4 is a beamforming circuit employed in the directional antenna of FIGS. 3*a*-3*b*. Referring to FIGS. 1, 3*a* and 4, wireless node 120 comprising the transparent wireless antenna 150' includes a phased antenna array of antenna elements 164, such as a 4*8 arrangement of FIGS. 3*a* and 4. In this arrangement, each vertical stack 165 of 4 elements is wired as shown (the shadow depiction of antenna elements 164 is schematic and illustrative; FIG. 3*a* denotes an expected physical arrangement of the antenna elements 164 and stacks 165 thereof. Such an arrangement is applicable to transmit and receive, pursuant to IEEE 802.11 employing TDD (Time Division Duplex) with bi-directional antennas. A set of phase switches 170-1 . . . 170-3 (170 generally) connected to each of the traces 162 provides vertical beamsteering to drive the antenna elements 164 in conjunction with delay elements 172-1 . . . 172-3 (172 generally). As applied to the example vertical hanging transparent antenna 150', switch 170-1 is closed to point the beamsteered signal down, 170-2 is closed to point straight out, and 170-3 is closed to point up. Alternative beamsteering and phased array techniques may be employed without deviating from the significance of the transparent antenna structure 150' as disclosed herein. Only one of the phase switches 170 is expected to be closed at a particular time. The antenna element 164 arrangement and phase delay provided by the delay elements 172 allow for the wireless network node 120-N to invoke the transparent antenna 150' to form a beam 178 of a width 176 for beamsteering a transmitted signal 156 toward a remote node 120-(N+1) downstream (or upstream to node 120-(N−1)).

In the example configuration, 8×8 MIMO may be employed in the radio circuit 152, depending on cost and footprint specifications. As of 2011, available low cost integrated silicon solutions are limited to 4×4 MIMO but 8×8 and higher order MIMO should become commercially available in time. For this specific configuration, we have eight vertical arrays spread horizontally. Each vertical group consists of four antenna elements with ½ wavelength spacing and three different feed arrangements 174-1 . . . 174-3. The second arrangement 174-2 feeds all elements 164 at the same phase, thus producing an antenna beam directed perpendicular to the assembly, i.e. horizontally. The first and third feed arrangements 174-1 and 174-3 introduces phase delays between elements. With the third feed arrangement, driven from the bottom, we get a beam aimed 25 degrees above the perpendicular. With the first feed arrangement, driven from the top, we get a beam aimed 25 degrees below the perpendicular. Thus, with an antenna configured for a 30 degree beam, we get 80+ degrees of potential coverage in a vertical direction. The choice of which feed arrangement to use at any given instant is made by digitally enabling in-line RF switches (for example, using PIN diode switches).

The antenna elements 164 are therefore responsive to a delay signal based on the feed arrangements 174 and the delay elements 172, wherein the delay signal controls timing of the activation signal such that the resulting signal experiences constructive interference at a predetermined direction and destructive interference at directions other than the predetermined direction. In the example arrangement, the delay signal results from MIMO (Multiple input multiple output) such that the resulting signal defines a beamformed signal 178 having a beam width 176, in which the beamformed width projects in a direction defined by selective activation of the antenna elements 164 resulting from the delay signal. The delay signal is therefore a beamsteering signal, such that the beamsteering signal directs the resulting signal in a predetermined direction, in which the predetermined direction has a vertical component and a horizontal component determined by ordering of the activation signals transported to the vertical and horizontal antenna elements.

Those skilled in the art should readily appreciate that the antenna apparatus and associated controls as defined herein are deliverable to a networking environment in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the antenna apparatus as defined herein has been particularly shown and described with references to embodiments thereof, it will be understood by those skilled in the art that various changes in form and details may be made therein without departing from the scope of the invention encompassed by the appended claims.

What is claimed is:

1. A multi-element transparent directional antenna comprising:

a substantially transparent substrate for adhering conductive circuit elements;

a plurality of antenna elements arranged on a surface of the substrate for providing beamforming to a resulting wireless signal transmitted from the antenna elements;

a radio circuit disposed on the substrate for activating the antenna elements; and traces on the substrate interconnecting each of the antenna elements to the radio circuit for transporting activation signals between the radio circuit and the antenna elements.

2. The antenna of claim 1 wherein the substrate includes a conductive layer configured as a ground plane and a dielectric layer adhered to the conductive layer between the traces.

3. The antenna of claim 2 wherein the traces are transparent microstrips having conductive properties for transporting signals between the radio circuit and the antenna elements, the signals configured for internode transport between a plurality of directional antennas.

4. The antenna of claim 1 wherein the antenna elements are responsive to a delay signal, the delay signal controlling timing of the activation signal such that the resulting signal experiences constructive interference at a predetermined direction and mitigating interference at directions other than the predetermined direction.

5. The antenna of claim 4 where the delay signal results from MIMO (Multiple input multiple output) such that the resulting signal defines a beamformed signal having a beam width, the beamformed width projecting in a direction defined by selective activation of the antenna elements resulting from the delay signal.

6. The antenna of claim 5 wherein the delay signal is a beamsteering signal, the beamsteering signal directing the resulting signal in a predetermined direction, the predetermined direction having a vertical component and a horizontal component determined by ordering of the activation signals transported to the vertical and horizontal antenna elements.

7. The antenna of claim 1 wherein the antenna elements include transmit elements and receive elements, the antenna elements defining a phased array responsive to phased array switching for aiming the resulting signal such that the transmitted signal is stronger in the aimed direction, the phased array responsive to phased switching for activating the antenna elements according to a timing sequence for providing the aiming.

8. The antenna of claim 1 wherein the antenna elements are disposed according to a predetermined spacing based on the expected wavelength, the predetermined spacing configuring the antenna elements for beamforming a directional signal having an arc width based on the predetermined spacing.

9. The antenna of claim 8 further comprising disposing the antenna elements in a predetermined pattern defining a horizontal component and a vertical component, the horizontal component responsive to the delay signal for directing the resulting signal along a horizontal axis and the vertical components directing the resulting signal along a vertical axis.

10. The antenna of claim 9 wherein the vertical component is responsive to a phased array control and the horizontal component is responsive to a MIMO control.

11. The antenna of claim 1 wherein the trace elements are raised above the substrate, the trace elements defining a void, the void filled with a nonconductive substance having similar optical properties as the trace elements, the nonconductive substance filling the voids substantially flush with a top surface of the trace elements to define a planar surface.

12. A system for transporting information between subscribers and a service provider, comprising:

disposing a plurality of line-of-sight nodes in a service area, each of the line-of-sight nodes having a clear optical path to at least one other of the plurality of nodes; and at least one of the line-of-sight nodes configured with a transparent directional antenna, the transparent directional antenna including an array of antenna elements configured for beamforming and beamsteering a transport signal to another of the line-of-sight nodes.

13. The system of claim 12, further comprising employing the beamforming and beamsteering for scanning the service area for identifying adjacent line-of-sight nodes, each of the adjacent nodes having a relay radio configured for communication back to the service provider via adjacent line-of-sight nodes completing a path back to the service provider, and a transport radio configured or communication to end users and to adjacent line-of-sight nodes.

14. The system of claim 12 wherein at least on of the transparent directional antennas comprising:

a substantially transparent substrate for adhering conductive circuit elements;

a plurality of antenna elements arranged on a surface of the substrate for providing beamforming to a resulting signal transmitted from the antenna elements;

a radio circuit disposed on the substrate for activating the antenna elements; and traces on the substrate interconnecting each of the antenna elements to the radio circuit for transporting activation signals between the radio circuit and the antenna elements.

15. The system of claim 14 wherein the substrate includes a conductive layer configured as a ground plane and a dielectric layer adhered to the conductive layer between the traces.

16. The system of claim 15 wherein the traces are transparent microstrips having conductive properties for transporting signals between the radio circuit and the antenna elements, the signals configured for internode transport between a plurality of directional antennas.

17. The system of claim 14 wherein the antenna elements include transmit elements and receive elements, the antenna elements defining a phased array responsive to phased array switching for aiming the resulting signal such that the transmitted signal is stronger in the aimed direction, the phased array responsive to phased switching for activating the antenna elements according to a timing sequence for providing the aiming.

18. A method for deploying a line-of-sight wireless network comprising:

disposing a substantially transparent substrate for adhering conductive circuit elements in a line of sight network proximate to other line-of-sight wireless nodes;

arranging a plurality of antenna elements on a surface of the substrate for providing beamforming to a resulting signal transmitted from the antenna elements;

disposing a radio circuit on the substrate for activating the antenna elements; and interconnecting traces on the substrate for coupling each of the antenna elements to the radio circuit for transporting activation signals between the radio circuit and the antenna elements;

the substrate comprising a transparent directional antenna configured for beamforming and beamsteering a transport signal to another of the line-of-sight nodes.

19. The method of claim 18 further comprising employing the beamforming and beamsteering for scanning the service area for identifying adjacent line-of-sight nodes, each of the adjacent nodes having a relay radio configured for communication back to the service provider via adjacent line-of-sight nodes completing a path back to the service provider, and a transport radio configured or communication to end users and to adjacent line-of-sight nodes.

20. The method of claim 18 wherein the antenna elements are responsive to a delay signal, the delay signal controlling timing of the activation signal such that the resulting signal experiences constructive interference at a predetermined direction and mitigating interference at directions other than the predetermined direction.

21. The method of claim 20 where the delay signal results from MIMO (Multiple input multiple output) such that the resulting signal defines a beamformed signal having a beam width, the beamformed width projecting in a direction defined by selective activation of the antenna elements resulting from the delay signal.

22. The method of claim 18 further comprising:

disposing the antenna elements according to a predetermined spacing based on the expected wavelength, the predetermined spacing configuring the antenna elements for beamforming a directional signal having an arc width based on the predetermined spacing; and disposing the antenna elements in a predetermined pattern defining a horizontal component and a vertical component, the horizontal component responsive to the delay signal for directing the resulting signal along a horizontal axis and the vertical components directing the resulting signal along a vertical axis.

* * * * *